United States Patent
Kenworthy et al.

(10) Patent No.: US 7,151,131 B2
(45) Date of Patent: Dec. 19, 2006

(54) COMPOSITION AND MEDIA

(75) Inventors: Mark Kenworthy, Manchester (GB); Stephen George Yeates, Manchester (GB); Tom Annable, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 102 days.

(21) Appl. No.: 10/490,032

(22) PCT Filed: Oct. 2, 2002

(86) PCT No.: PCT/GB02/04467

§ 371 (c)(1),
(2), (4) Date: Mar. 19, 2004

(87) PCT Pub. No.: WO03/033606

PCT Pub. Date: Apr. 24, 2003

(65) Prior Publication Data

US 2004/0234710 A1    Nov. 25, 2004

(30) Foreign Application Priority Data

Oct. 17, 2001    (GB)    ................. 0124860.8

(51) Int. Cl.
*C08L 39/00*    (2006.01)
*C08K 3/20*    (2006.01)
*C08K 3/36*    (2006.01)

(52) U.S. Cl. ............. 524/555; 524/430; 524/492

(58) Field of Classification Search ............ 428/32.1, 428/32.38
See application file for complete search history.

(56) References Cited

U.S. PATENT DOCUMENTS

| | | | | |
|---|---|---|---|---|
| 5,589,259 A | * | 12/1996 | Hosoi et al. ............. | 428/32.18 |
| 5,827,363 A | * | 10/1998 | Darsillo et al. ............. | 106/484 |
| 5,965,244 A | | 10/1999 | Tang et al. ................. | 428/195 |
| 6,197,880 B1 | | 3/2001 | Nigam ....................... | 524/845 |
| 6,284,819 B1 | * | 9/2001 | Darsillo et al. ............... | 524/22 |
| 7,056,969 B1 | * | 6/2006 | Cuch et al. ................. | 524/425 |
| 2002/0006571 A1 | * | 1/2002 | Suda et al. ................. | 430/114 |

FOREIGN PATENT DOCUMENTS

| | | | |
|---|---|---|---|
| EP | 485079 A1 | * | 5/1992 |
| WO | WO 99/54144 A1 | * | 10/1999 |
| WO | WO 00/37258 | | 6/2000 |
| WO | WO 00/58107 | | 10/2000 |

* cited by examiner

*Primary Examiner*—Callie Shosho
(74) *Attorney, Agent, or Firm*—Morgan Lewis & Bockius LLP

(57) ABSTRACT

A coating composition comprising pigment, medium and a binder characterised in that (i) the binder comprises a cationic polymer comprising a repeat unit of Formula (1):

$$-X-NH-\underset{\underset{NH}{\|}}{C}-NH-\underset{\underset{NH}{\|}}{C}-NH-Y-NH-\underset{\underset{NH}{\|}}{C}-NH-\underset{\underset{NH}{\|}}{C}-NH-$$

Formula (1)

wherein:

X and Y are the same or different and represent divalent organic linking groups; and (ii) the weight ratio of pigment to binder in the composition is at least 2:1. The compositions are useful for preparing ink jet recording materials with good water resistance, print quality and dry time.

13 Claims, No Drawings

COMPOSITION AND MEDIA

This invention relates to a coating compositions, to recording materials and to processes for making and using recording materials.

Ink-jet printing (IJP) is a non-impact printing technique in which droplets of ink are ejected through a fine nozzle onto a recording material without bringing the nozzle into contact with the recording material. The images prepared by IJP desirably meet many demanding requirements. For example, they should be sharp and non-feathered and should also exhibit high water-fastness, light-fastness, humidity-fastness and optical density without suffering from significant hue shift. Both the ink and recording material used in forming the image play a key role in ensuring these requirements are met.

Recording material used in ink-jet printing can be plain paper, coated paper, plastic film, cloth, and any other coated or uncoated material that can absorb ink and form a good image. However, in order to form a high resolution image, the recording material is usually comprises a substrate carrying a dry coating layer obtained from a specially formulated coating composition. These coating layers can be divided into two major categories: fully dense coatings (also known as swellable coatings) and porous coatings.

The fully dense coatings are mainly comprised of film-forming polymers, with at least one of the polymers being hydrophilic. This hydrophilic polymer is either water soluble or water swellable. Sometimes a small amount of pigment is incorporated into these coatings, but the weight ratio of pigment to binder in the coating composition is usually 1:1 or less. Fully dense coatings give a glossy surface and are usually transparent. They absorb ink and form an image through rapid swelling of the coating itself. However, they often display poor wet-fastness and rub-fastness.

International Patent application WO00/37258 and U.S. Pat. No. 6,197,880 describe the use of PHMB as a fixing agent in fully dense coatings for ink-jet printing.

Ink droplets applied by ink-jet printing are rapidly absorbed into porous coatings through capillary action with the result that the image is touch-dry soon after printing. Thus, porous coatings have the advantage over fully dense coatings in that they allow faster "drying" of the ink. We have surprisingly found that certain coating compositions are useful for preparing recording materials having beneficial properties.

Thus, according to the present invention there is provided a coating composition comprising pigment, medium and binder, characterised in that (i) the binder comprises a cationic polymer comprising a repeat unit of Formula (1):

Formula (1)

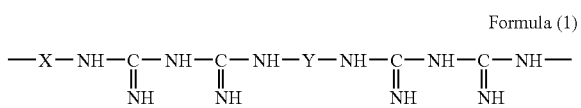

wherein:

X and Y are the same or different and represent divalent organic linking groups; and (ii) the weight ratio of pigment to binder in the composition is at least 2:1.

The pigment preferably comprises clay, calcium carbonate, magnesium carbonate, silica (especially surface modified silica), zeolite, alumina or a combination of two or more thereof.

Preferably the pigment comprises alumina or surface modified silica or a mixture thereof.

It is also preferred that the pigment is a porous pigment because this improves the porosity and water-fastness of resultant recording materials. Examples of preferred porous pigments include fumed and precipitated silicas.

Preferably the pigment has a BET surface area greater than 25 $m^2/g$, more preferably greater than 50 $m^2/g$.

The cationic polymer of Formula (1) is preferably in the form of a salt. Preferred salts are those with organic or inorganic acids, especially water-soluble salts, for example the gluconate, acetate, phosphate or hydrochloride salt.

In the repeat unit of Formula (1) X and Y are preferably each independently optionally interrupted alkylene, more preferably optionally interrupted $C_{2-12}$-alkylene and especially $C_{4-8}$-alkylene; arylene, more preferably $C_{6-10}$-arylene, especially phenylene; and aralkylene, more preferably $C_{7-11}$-aralkylene, especially benzylene or xylylene.

When X and Y are interrupted alkylene, they are preferably interrupted by —O—, —S—, —NH—, —C(=O)— or phenylene.

Examples of preferred alkylene groups represented by X and Y include —$(CH_2)_6$—, —$(CH_2)_8$—, —$CH_2CH(—)(CH_2)_4$ $CH_3$, 1,4- 2,3- and 1,3-butylene, 2,5-hexylene and 3-methyl-1,6-hexylene.

Examples of preferred interrupted alkylene groups represented by X and Y include —$CH_2C_6H_4CH_2$—, —$CH_2OC_6H_4OCH_2$—, —$CH_2OC_6H_{10}OCH_2$—, —$(CH_2)_3$ $O(CH_2)_3$— and —$(CH_2)_2S(CH_2)_2$—.

It is especially preferred that X and Y are $C_{4-8}$-alkylene, more especially hexylene.

Particularly preferred cationic polymers are those where the cationic polymer is a polymeric biguanide consisting essentially of repeating units of Formula (1).

The nature of the terminating groups on the cationic polymer is not believed to be critical. However, preferred terminating groups include acyl, more preferably $CH_3CO$; H; optionally substituted alkyl, more preferably optionally substituted $C_{1-10}$alkyl; acyloxy, preferably —OC(O)($C_{1-4}$-alkyl); halo more preferably F or Cl; cyano; optionally substituted amino; a group of the formula:

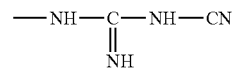

and optionally substituted phenyl. Preferred optional substituents on the terminating groups include $C_{1-4}$-alkyl, halo (especially Cl), nitro and $C_{1-4}$-alkoxy (especially methoxy). The terminating group at each end of the polymer may be the same or different.

These preferred polymeric biguanides are typically in the form of a mixture of polymer chains, many or all of which are of different lengths. Preferably, the number of individual biguanide units in a polymer chain:

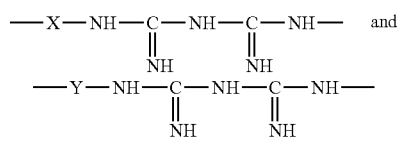

taken together, is from 3 to about 80.

In view of the foregoing preferences a particularly preferred cationic polymer is a polymeric biguanide consisting essentially, excluding the terminating groups, of repeat units of Formula (2) or salts thereof:

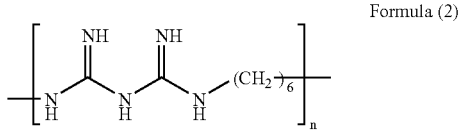

Formula (2)

wherein:
n is from 2 to 100.
n is preferably from 2 to 40, more preferably from 2 to 30 and especially from 4 to 15.

When the polymeric biguanide is a mixture of poly(hexamethylene biguanide) polymer chains of the Formula (2) it is especially preferred that the average value of n in the mixture is about 12.

Preferably, the number average molecular weight of the cationic polymer is from 550 to 6600.

The polymeric biguanides may be prepared by the reaction of a bisdicyandiamide of the formula:

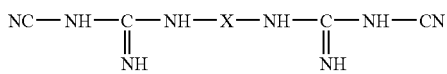

with a diamine of the formula $H_2N-Y-NH_2$; or by reaction between a diamine salt of dicyanimide having the formula:

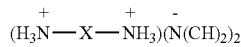

with a diamine of the formula $H_2N-Y-NH_2$ wherein X and Y are as hereinbefore defined. These methods of preparation are described in more detail in GB 702,268 and GB 1,152,243 and any of the polymeric biguanides described therein may be used in the present invention.

The cationic polymer is preferably colourless or substantially colourless.

In a preferred composition the binder comprises a cationic polymer comprising a repeat unit of Formula (1), as defined above, and one or more further.

The additional binder is preferably a polymeric binder, more preferably a water-soluble or water-dissipatable polymeric binder.

The preferred water-soluble polymeric binders include starches, preferably hydroxy alkyl starches, for example hydroxyethylstarch; celluloses, for example cellulose, methylcellulose, hydroxyethylcellulose, hydroxypropylcellulose, hydroxyethyl methyl cellulose, carboxymethylcellulose (and salts thereof) and cellulose acetate butyrate; gelatin; gums, for example guar, xanthan gum and gum arabic; polyvinylalcohol; polyvinylphosphate; polyvinylpyrrolidone; polyethylene glycol; hydrolysed polyvinylacetate; polyethylene imine; polyacrylamides, for example polyacrylamide and poly(N,N-dimethyl acrylamide) and polyacrylamido-2-methyl propane sulphonic acid); acrylamide-acrylic acid copolymers; polyvinylpyridine; polyvinylphosphate; vinylpyrrolidone-vinyl acetate copolymers; vinyl pyrrolidone-styrene copolymers; polyvinylamine; poly(vinyl pyrrolidonedialkylaminoalkyl alkylacrylates), for example poly vinylpyrrolidone-diethylaminomethylmethacrylate; acid-functional acrylic polymers and copolymers, for example poly(meth)acrylic acid and copolymers of (meth)acrylic acid and other (meth)acrylate monomers; amine-functional acrylic polymers and copolymers, for example polydimethylaminoethylmethacrylate; acid or amine functional urethane polymers, for example those containing dimethylolpropanoic acid and/or pendant or terminal polyethylene glycols; ionic polymers, for example poly (N,N-dimethyl-3,5-dimethylene piperidinium chloride); polyesters, preferably those which carry water-solubilising groups such as sulphonic acid groups, for example polyesters obtainable by polymerising a polyol with sodiosulphoisophthalic acid.

Preferred water-dissipatable polymeric binders are preferably: latex polymers, for example cationic, non-ionic and anionic styrene-butadiene latexes; vinyl acetate-acrylic copolymer latexes; acrylic copolymer latexes which carry amino groups, for example containing copolymerised dimethylaminoethyl (meth)acrylate; and dispersions of polyester, polyurethane, (meth)acrylate or vinyl polymers and copolymers thereof. The polymer dispersions are preferably prepared by emulsion polymerisation or by dispersion into water of polymers prepared by suspension, bulk or solution polymerisation.

A combination of water-soluble polymeric binders and water-dissipatable polymeric binders can be beneficial in terms of improved mechanical strength, reduced tendency for sheets to stick together and good ink absorbency.

Overall particularly good results are found when the additional binder is polyvinylalcohol, methylcellulose, polyvinylpyrrolidone, or any combination thereof.

In a particularly preferred composition the binder comprises the cationic polymer comprising a repeat unit of Formula (1) and polyvinylalcohol. Preferably the polyvinyl alcohol is obtained by hydrolysis of polyvinylacetate, more preferably the hydrolysis value is greater than 70%. It is also preferred that the molecular weight of the polyvinyl alcohol is greater than 10,000 more preferably greater than 50,000.

Preferably the weight ratio of pigment to binder in the composition is from 2:1 to 10:1.

It is preferred that the weight ratio of pigment to total binder in the composition is at least 3:1 and more preferably at least 4:1, especially at least 5:1 and more especially at least 6:1, with a preferred upper limit of 10:1.

Preferably the medium is a liquid medium since this makes it easier to apply the composition to the substrate. The binder that comprises a cationic polymer comprising a repeat unit of Formula (1) and any additional binder(s) are preferably dispersed or more preferably dissolved in the liquid medium. The liquid medium is preferably selected from water; organic solvent and a mixture of water and organic solvent. The organic solvent may comprise a mixture of one or more different organic solvents.

When the liquid medium comprises a mixture of water and organic solvent, the organic solvent is preferably water-soluble organic solvent.

It is also preferred that when the liquid medium comprises a mixture of water and organic solvent that the organic solvent is less than 20% more preferably less than 10% by weight.

Preferred water-soluble organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; diols, preferably diols having from 2 to 12 carbon atoms, for example pentane-1, 5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone,; sulphoxides, preferably sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

When the liquid medium comprises only organic solvent it is preferred that it is free from water, (i.e. less than 1% water by weight).

When the liquid medium comprises only organic solvent it is also preferred that the solvent has a boiling point of from 30° to 200° C., more preferably of from 40° to 150° C., especially from 50 to 125° C. The organic solvent may be water-immiscible, water-soluble or a mixture of such solvents. Preferred water-soluble organic solvents are any of the hereinbefore described water-soluble organic solvents and mixtures thereof.

Preferred water-immiscible solvents include, for example: aliphatic hydrocarbons; esters, preferably ethyl acetate; chlorinated hydrocarbons, preferably $CH_2Cl_2$; and ethers, preferably diethyl ether; and mixtures thereof.

It is especially preferred that the liquid medium comprises water or a mixture of water and one or more water-soluble organic solvent(s).

The composition may also comprise further ingredients if desired, for example catalysts (e.g. to accelerate cross-linking of the binder), polymeric fillers (e.g. polymethylmethacrylate particles of 10 to 50 μm diameter), primers, drying-time accelerants, adhesion promoters, defoamers, biocides, surfactants, cationic or anionic salts to name but a few.

Preferably the composition also contains a cross-linker, preferably in an amount that causes from 0.1 to 5%, more preferably 0.15 to 4%, especially 0.2 to 2% cross-linking of cross-linkable components of the composition. These levels of cross-linking are preferred because they can result in enhanced mechanical strength of resultant coated materials without adversely affecting ink-absorbing properties.

Preferred cross-linkers include boric acid, isocyanate and blocked isocyanates, aziridines, carbodiimides and salts of divalent and trivalent metals (e.g. calcium and magnesium acetate).

A preferred coating composition comprises:
(a) 0.5 to 25 parts of a binder comprising 0.5 to 15 parts of a cationic polymer comprising a repeat unit of Formula (1) and 0 to 24.5 parts, more preferably 5 to 24.5 parts, of a further binder;
(b) 7.5 to 50 parts of pigment; and
(c) 1 to 90 parts of a liquid medium comprising water or a mixture of water and organic solvent;
wherein all parts are by weight, the total number of parts (a)+(b)+(c)=100 and the weight ratio of pigment to total binder in the composition is at least 2:1.

A more preferred coating composition comprises:
(a) 0.5 to 25 parts of a binder comprising 0.5 to 15 parts of a cationic polymer comprising a repeat unit of Formula (2) and 5 to 24.5 parts of a further binder comprising or consisting essentially of polyvinylalcohol, methylcellulose, polyvinylpyrrolidone, or any combination thereof;
(b) from 7.5 to 50 parts of porous pigment;
(c) 4 to 90 parts of a liquid medium comprising from 0 to 10 parts of water-soluble organic solvent and from 40 to 80 parts water;
wherein all parts are by weight, the total number of parts (a)+(b)+(c)=100 and the weight ratio of pigment to total binder in the composition is at least 2:1.

Preferred substrates include paper, plastic, a textile, metal or glass, more preferably paper, a textile or a plastic film (especially a transparent film, for example an overhead projector slide). It is especially preferred that the substrate is plain paper, coated paper or a transparent plastic film.

The composition may be applied to the substrate using any convenient method, for example by dip coating, reverse roller coating, K-bar coating, spraying or by means of an ink-jet printer. After application of the composition to the substrate it is preferred that the composition is dried and/or polymerised (e.g. cross-linked). Any suitable drying method may be used, for example hot air drying.

According to a second aspect of the invention there is provided a recording material obtained from applying a composition according to the first aspect of the invention to a substrate.

In the process of the second aspect of the invention the composition may be applied to part or all of the recording material. When the recording material is in sheet form the composition according to the first aspect of the invention is optionally applied to one or both sides thereof, more preferably to one side of the sheet.

The process by which the recording material has been obtained preferably further comprises the step of drying the composition during or after it has been applied to the substrate, thereby forming a dry coating (a layer obtained in this way is hereinafter abbreviated as a "Coating Layer") on the substrates.

It is also preferred that the dry coating has a total pore volume in the range 20 to 95% more preferably 30 to 75% relative to the total volume of the dry coating.

Preferably the pigment is a cationic pigment, i.e. the zeta potential of the pigment is positive at the pH of the composition. In this case it is preferred that the binder is non-ionic or cationic (or both) at the pH of the coating composition prior to coating.

The Coating Layer may be the sole layer of a single layer coating on the substrate, or a layer that forms part of a multi-layer coating on the substrate.

When the substrate bears the composition in the form of a multi-layer coating the Coating Layer may be at any position of the multi-layer coating, for example it may optionally be the inner-most layer in direct contact with the substrate, the outer-most layer, a layer between the inner-most and outer-most layers, or Coating Layers may be present at two or more of such positions. When the outer-most layer is not a Coating Layer the layers that are further away from the substrate than the Coating Layer should be permeable or porous to allow ink to come into contact with the Coating Layer. It is however preferred that a Coating Layer is present as the only layer or the outer-most layer of a multi-layer coating on a substrate (i.e. the layer furthest away from the substrate) because this ensures good contact with inks during ink-jet printing.

The preferred substrates for use in the second aspect of the invention are as defined in the first aspect of the present invention.

It is especially preferred that the substrate is plain paper, treated paper or a transparent plastic film.

The recording material preferably has a thickness of from 10 to 1000 µm, more preferably from 50 to 500 µm. The substrate preferably has a thickness of from 9 to 990 µm, more preferably from 49 to 499 µm. The coating, whether single- or multi-layered, preferably has an overall thickness of from 0.1 to 100 µm, more preferably from 5 to 50 µm, especially from 10 to 40 µm.

The composition is preferably applied to the substrate by the methods described above in relation to the first aspect of the invention.

The recording materials may be used as ink receptive sheets in a wide range of printing processes, especially ink-jet printing. They are able to provide excellent quality images, often of near photographic quality, having good wet-fastness, light-fastness, gloss and low sticking and cracking properties. The resultant prints usually have good optical density, even with black pigment inks that often suffer from a drop in optical density, an unsightly grey appearance and poor image quality when printed onto conventional recording sheets. The humidity fastness is also good. Furthermore the sheets benefit from good storage stability and a low susceptibility to microbial decay.

Preferably the recording material is white or transparent.

According to a third aspect of the invention there is provided a process for forming a recording material that comprises applying a composition according to the first aspect of the invention to a substrate.

The composition is preferably applied as described in the second aspect of the invention.

Preferred substrates in the third aspect of the invention are as described in the second aspect of the invention.

According to a fourth aspect of the invention there is provided an ink-jet printing process that comprises applying ink to a recording material according to the second aspect of the invention by means of an ink-jet printer.

The invention is further illustrated by the following examples in which all parts and percentages are by weight unless specified otherwise.

The following abbreviations are used for examples:

PVOH (10%) means by a polyvinyl alcohol binder (Mowiol™ 40–88 supplied by Harlow Chemical Company Ltd.) as a 10% by weight stock solution in de-ionised water.

Alumina (40%) means alumina pigment dispersion in water (40% solids by weight, PG003, ex Cabot Chemical Co.).

PHMB (20%) means PHMB hydrochloride (20% by weight aqueous solution, Cosmocil™ CQ, ex Avecia Biocides).

EXAMPLES 1 AND 2

Stage 1—Preparation of Compositions

The compositions described in Table 1 were prepared by mixing a polyvinyl alcohol binder (Mowiol™ 40–88 supplied by Harlow Chemical Company Ltd.) as a 10% by weight stock solution in de-ionised water with an alumina pigment dispersion in water (40% solids by weight, PG003, ex Cabot Chemical Co.) and PHMB hydrochloride (20% by weight aqueous solution, Cosmocil CQ, ex Avecia Biocides).

TABLE I

|  | Pigment to Binder Ratio | PVOH (10%) | PHMB (20%) | Alumina (40%) | Water |
|---|---|---|---|---|---|
| Control 1 | 6:1 | 10 | 0 | 15 | 10 |
| Example 1 | 6:1 | 7.5 | 1.25 | 15 | 11.25 |
| Example 2 | 6:1 | 5 | 2.5 | 15 | 12.5 |
| Control 2 | 1:1 | 10 | 2.5 | 2.5 | 0 |

The pigment to binder weight ratio is given by (weight of Alumina (40%)×2.5):(weight of PVOH (10%)×10+weight of PHMB 20%×5).

Stage 2—Preparation of Recording Materials

The formulations described in Table 1 were coated onto white card using a number 7 K-bar. The coatings were then dried in an oven at 100° C. for 3 minutes. All coatings were examined and found to be smooth and even and devoid of cracks.

Stage 3—Printing of Recording Materials

The recording materials from Stage 2 were then ink-jet printed using a Canon BJC8200 colour ink-jet printer using the standard ink-set i.e. cyan, magenta, yellow and black ink.

The prints were made in the form of a grid consisting of 2 mm parallel lines separated unprinted areas of 7 mm.

Print quality was assessed in terms of evenness of colour and absence of mottle as:

1=excellent

2=average

3=poor

Dry-time was assessed as:

1=prints touch dry immediately after printing

2=touch dry in>30 s 3 touch dry in>2 minutes.

The results of the print quality and dry-time tests are shown in Table 2 below.

Stage 4—Water-fastness Testing of Recording Materials

Water-fastness was assessed by performing water run-downs on the printed recording materials from Stage 3. The prints were allowed to dry at room temperature before they were inclined at 45° to the horizontal and 1 ml of water was run down over the print at a right angle to the direction of the printed lines. The unprinted areas were then examined to determine the extent of any colour running from the printed lines to the unprinted areas. The substrates were given a scoring according to the following criteria:

1=No run-down evident (complete water resistance in this test)

2=Some colour run-down evident

3=Very bad colour run-down evident (no water resistance)

Stage 5—Results

The results of the assessments performed in Stage 3 and Stage 4 are shown in Table 2.

TABLE 2

|  | Water Resistance (Black) | Water Resistance (Magenta) | Water Resistance (Yellow) | Water Resistance (Cyan) | Print Quality | Dry-time |
| --- | --- | --- | --- | --- | --- | --- |
| Example 1 | 1 | 1 | 1 | 1 | 1 | 1 |
| Example 2 | 1 | 1 | 1 | 1 | 1 | 1 |
| Control 1 | 2 | 2 | 1 | 1 | 1 | 1 |
| Control 2 | 1 | 1 | 1 | 1 | 2 | 2 |

From Table 2 it is apparent that Examples 1 and 2 show superior performance to both Control 1 (which lacks a compound of Formula (1)) and Control 2 (which has a low pigment to binder weight ratio of 1:1).

The invention claimed is:

1. A coating composition comprising pigment, medium and a binder characterised in that (i) the binder comprises a cationic polymer comprising a repeat unit of Formula (1):

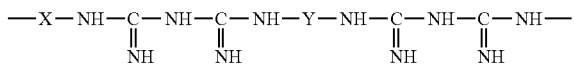

Formula (1)

wherein:
X and Y are the same or different and represent divalent organic linking groups;
and (ii) the weight ratio of pigment to binder in the composition is at least 4:1 and the pigment has a BET surface area greater than 25 m²/g.

2. A composition according to claim 1 wherein the weight ratio of pigment to binder in the composition is at least 4:1 and has an upper limit of 10:1.

3. A composition according to claim 1 or claim 2 wherein the binder comprises a cationic polymer comprising a repeat unit of Formula (1) and one or more further binders.

4. A composition according to claim 1 or 2 wherein the pigment comprises alumina or surface modified silica or a mixture thereof.

5. A composition according to claim 1 or 2 wherein the medium is a liquid and comprises water or a mixture of water and one or more water-soluble organic solvent(s).

6. A composition according to claim 1 or 2 wherein the cationic polymer is a polymeric biguanide consisting essentially, excluding the terminating groups, of repeat units of Formula (2) and salts thereof:

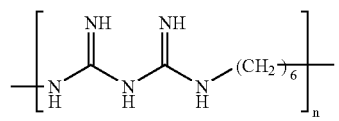

Formula (2)

wherein:
n is from 2 to 100.

7. A porous coating composition according to claim 6 which comprises:
(a) 0.5 to 25 parts of a binder comprising 0.5 to 15 parts of a cationic polymer comprising a repeat unit of Formula (2) and 5 to 24.5 parts of a further binder comprising polyvinylalcohol, methylcellulose, polyvinylpyrrolidone, or any combination thereof;
(b) from 7.5 to 50 parts of porous pigment;
(c) 4.0 to 90 parts of a liquid medium comprising from 0 to 10 parts of water-soluble organic solvent and from 40 to 80 parts water;
wherein all parts are by weight, the total number of parts (a)+(b)+(c)=100.

8. A coating composition according to claim 1 or 2 which comprises:
(a) 0.5 to 25 parts of a binder comprising 0.5 to 15 parts of a cationic polymer comprising a repeat unit of Formula (1) and 0 to 24.5 parts of a further binder,
(b) 7.5 to 50 parts of pigment; and
(c) 1 to 90 parts of a liquid medium comprising a mixture of water and organic solvent;
wherein all parts are by weight, the total number of parts (a)+(b)+(c)=100.

9. A recording material obtained from applying a composition as defined in claim 1 or 2 to a substrate.

10. A recording material according to claim 9 wherein the substrate is plain paper, treated paper or a transparent plastic film.

11. An ink-jet printing process that comprises applying an ink to a recording material defined in claim 10 by means of an ink-jet printer.

12. A composition according to claim 1 wherein the weight ratio of pigment to binder in the composition is at least 5:1.

13. A composition according to claim 1 wherein the weight ratio of pigment to binder in the composition is at least 6:1.

* * * * *